US009575189B2

(12) United States Patent
Groves et al.

(10) Patent No.: US 9,575,189 B2
(45) Date of Patent: Feb. 21, 2017

(54) SEGMENTED RADIATION DETECTOR AND APPARATUS AND METHOD FOR USING SAME

(75) Inventors: Joel L. Groves, Leonia, NJ (US); Patrice Ligneul, Chaville (FR); Robert A. Adolph, Pennington, NJ (US); Paul Wanjau, Missouri City, TX (US); Tim Quinlan, Richmond, TX (US); Jack Purcell, Windsor, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 542 days.

(21) Appl. No.: 13/881,589

(22) PCT Filed: Oct. 28, 2011

(86) PCT No.: PCT/US2011/058330
§ 371 (c)(1),
(2), (4) Date: Sep. 1, 2013

(87) PCT Pub. No.: WO2012/058564
PCT Pub. Date: May 3, 2012

(65) Prior Publication Data
US 2013/0329859 A1    Dec. 12, 2013

Related U.S. Application Data

(60) Provisional application No. 61/407,649, filed on Oct. 28, 2010.

(51) Int. Cl.
*G01V 5/00* (2006.01)
*G01T 1/20* (2006.01)
*G01V 5/12* (2006.01)

(52) U.S. Cl.
CPC .............. *G01T 1/2006* (2013.01); *G01T 1/20* (2013.01); *G01V 5/12* (2013.01); *G01V 5/125* (2013.01)

(58) Field of Classification Search
CPC .......... G01V 5/101; G01V 5/04; G01V 5/104; G01V 5/12; G01V 5/125
See application file for complete search history.

(56) References Cited

U.S. PATENT DOCUMENTS 3,013,156 A * 12/1961 Hearn ...................... G01V 5/04
174/521
4,743,755 A    5/1988 Williams
(Continued)

OTHER PUBLICATIONS

International Search Report for PCT Application Serial No. PCT/US2011/058330 dated Jun. 19, 2012.

*Primary Examiner* — David J Makiya
*Assistant Examiner* — Dani Fox
(74) *Attorney, Agent, or Firm* — Trevor G. Grove

(57) ABSTRACT

Systems, methods, and devices involving segmented radiation detectors are provided. For example, a segmented radiation detector may include a segmented scintillator and an optical-to-electrical converter. The segmented scintillator may have several segments that convert radiation to light, at least one of which may detect radiation arriving from an azimuthal angle around an axis of the segmented scintillator. The optical-to-electrical converter may be coupled to the segmented scintillator. The optical-to-electrical converter may receive the light from the segments of the segmented scintillator and output respective electrical signals corresponding to the amount of radiation detected by each segment.

10 Claims, 5 Drawing Sheets

(56) References Cited

U.S. PATENT DOCUMENTS

| | | | |
|---|---|---|---|
| 5,065,016 A | 11/1991 | Supernaw et al. | |
| 6,307,199 B1* | 10/2001 | Edwards et al. | 250/269.3 |
| 6,781,115 B2* | 8/2004 | Stoller | G01V 5/104 250/266 |
| 7,339,172 B2 | 3/2008 | Rowland et al. | |
| 7,634,059 B2 | 12/2009 | Wraight | |
| 9,157,311 B2* | 10/2015 | Pelletier | E21B 49/10 |
| 2010/0017134 A1* | 1/2010 | Steinman | E21B 43/04 702/8 |
| 2011/0191027 A1* | 8/2011 | Pfutzner | E21B 47/10 702/6 |
| 2013/0119246 A1* | 5/2013 | Pai | E21B 47/065 250/262 |

* cited by examiner

SEGMENTED RADIATION DETECTOR AND APPARATUS AND METHOD FOR USING SAME

BACKGROUND

The present disclosure relates generally to downhole well-logging tools and, more particularly, to downhole well-logging tools that employ a segmented radiation detector.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A variety of downhole tools may be used to determine the properties of a subterranean formation or borehole fluid. Many such downhole tools may emit radiation, such as neutrons, x-rays, and/or gamma-rays into the materials that surround the downhole tool (e.g., the borehole fluid and/or the surrounding formation) to determine certain properties of the materials. To provide one example, X-rays or gamma-rays may interact with the materials of the borehole fluid and/or formation through Rayleigh and/or Compton scattering. The degree to which these interactions occur may affect the amount and energy of the radiation that returns to the downhole tool. Thus, by measuring the returning radiation, certain properties of the surrounding materials may be estimated.

Conventionally, these downhole tools may detect the returning radiation using one or more radiation detectors positioned to detect specific angles outside of the downhole tool. That is, each detector may detect radiation that returns to the downhole tool from only one azimuthal angle. Each detector may detect radiation from one side of the downhole tool, which may present an incomplete understanding of the materials on all sides of the downhole tool. Some techniques have been developed that involve rotating a downhole tool and/or the detectors of the downhole tool to detect radiation from other azimuthal angles. However, such mechanical rotation introduces additional complexity and potential points of failure.

Additionally, downhole tools used to determine the properties of a subterranean formation or borehole fluid may employ radioisotopic gamma-ray sources, but the use of such radioisotopic sources may have a variety of disadvantages. Specifically, such downhole tools may emit radiation using a first radioisotopic gamma-ray source, such as $^{137}$Cs, while using other radioisotopic gamma-ray sources of relatively lower strength as reference sources to emit a known amount of radiation directly at the radiation detectors. Because the sensitivity of the radiation detectors may vary and also may depend on environmental factors, which may change greatly as the downhole tool travels through the formation, the gain of the radiation detectors may be stabilized based on the radiation emitted by the reference sources. However, as mentioned above, the use of such radioisotopic sources may have several drawbacks. For example, radioisotopic sources in downhole tools may require special handling when the radioisotopic sources are inserted into or removed from the downhole tool. Additionally, these radioisotopic sources may require additional shielding during transportation and storage, as well as additional security during such transportation and storage. Indeed, in many countries, even very-low-strength radiation sources (e.g., $10^{-6}$ Ci) may be considered radioisotopic sources subject to burdensome regulations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices involving segmented radiation detectors. For example, a segmented radiation detector may include a segmented scintillator and an optical-to-electrical converter. The segmented scintillator may have several segments that convert radiation to light, at least one of which may detect radiation arriving from an azimuthal angle around an axis of the segmented scintillator. The optical-to-electrical converter may be coupled to the segmented scintillator. The optical-to-electrical converter may receive the light from the segments of the segmented scintillator and output respective electrical signals corresponding to the amount of radiation detected by each segment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
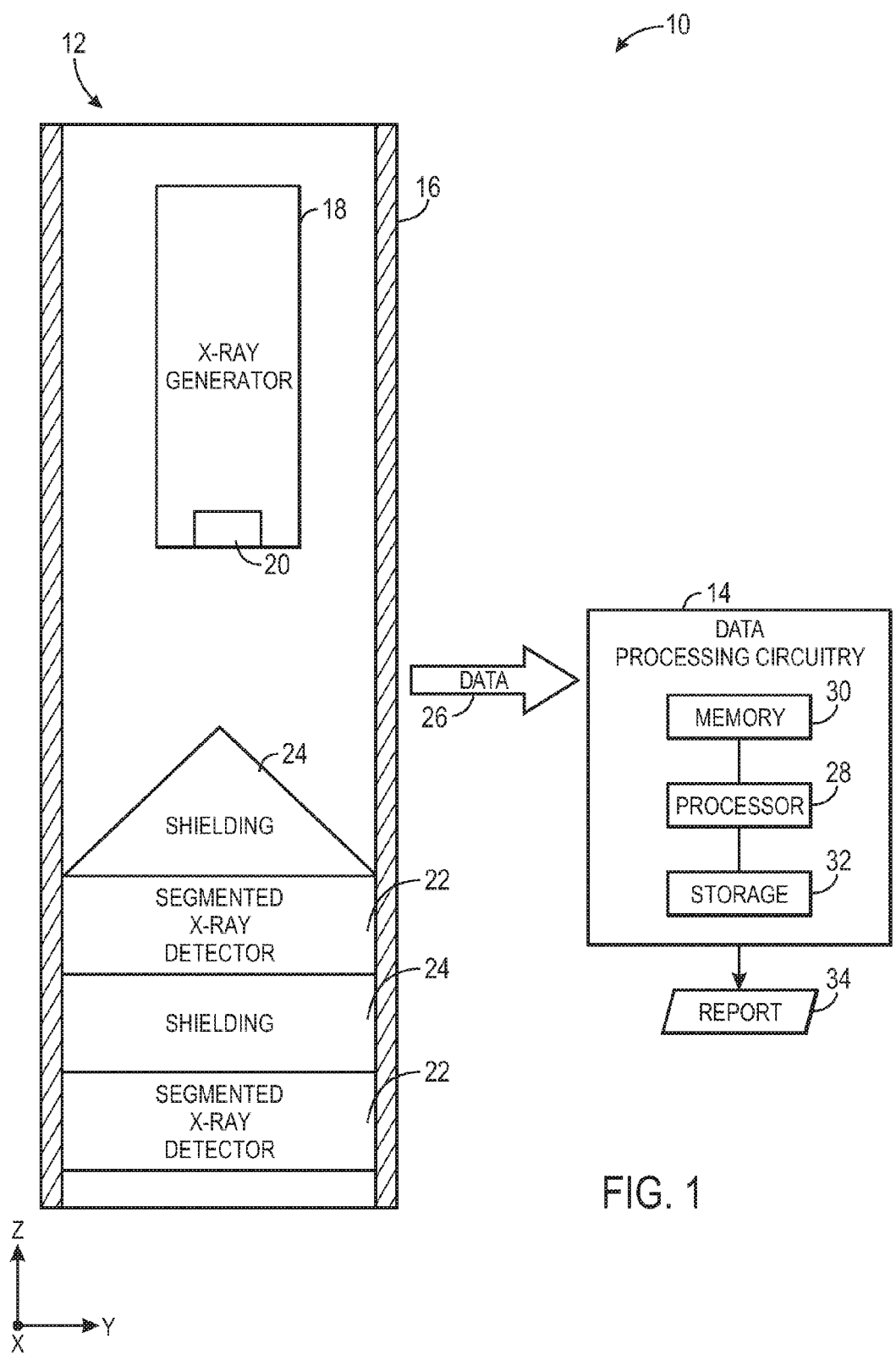
FIG. 1 is a schematic block diagram of a downhole tool capable of detecting radiation from multiple azimuthal angles using a segmented radiation detector, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to systems, methods, and devices that include a segmented radiation detector. Such a segmented radiation detector may include a segmented scintillator capable of detecting radiation from its various segments. The segments of the segmented scintillator may be coupled to a microchannel plate (MCP), which may be able to discern from which segment radiation is detected, or various photomultiplier tubes (PMTs) respectively coupled to different segments.

Such a segmented scintillator of a segmented radiation detector may include segments that detect radiation from a variety of azimuthal angles. When the segmented radiation detector is incorporated into a downhole tool, the downhole tool may detect radiation from the various azimuthal angles. For example, the downhole tool may emit radiation out of the downhole tool into the surrounding materials (e.g., borehole fluid and/or a subterranean formation) and measure the radiation that returns using the segmented radiation detector. Because the segmented radiation detector may detect radiation from several different azimuthal angles, properties of the materials located along such angles may be determined. In some embodiments, the downhole tool may determine the properties of the materials that surround the downhole tool on all sides.

Additionally or alternatively, a segmented scintillator of a segmented radiation detector may include a reference segment. This reference segment may be located away from or shielded from radiation entering the downhole tool from outside. Specifically, the reference segment may only detect radiation that arrives at the segmented radiation detector internally through the downhole tool from the radiation source of the downhole tool. The radiation detected by the reference segment may be used to stabilize the gain of the segmented radiation detector against the output of the radiation source. Before continuing further, it should be noted that while the following examples refer to a segmented X-ray detector, alternative embodiments may involve a segmented scintillator configured to detect any radiation of interest.

With the foregoing in mind, FIG. 1 illustrates a well-logging system 10 that employs such a segmented radiation detector. The well-logging system 10 includes a downhole tool 12 and data processing circuitry 14. Although the downhole tool 12 and the data processing circuitry 14 are schematically represented as independent elements in FIG. 1, it should be appreciated that in some embodiments, the data processing circuitry 14 may be located within the downhole tool 12, at the surface, or partially within the downhole tool 12 and partially at the surface. The downhole tool 12 may include a tool housing 16 that contains a variety of components, such as an X-ray generator 18 having a target 20, one or more segmented X-ray detectors 22, and X-ray shielding 24. Although the downhole tool 12 is illustrated in FIG. 1 as including the X-ray generator 18, alternative embodiments may include any other suitable radiation source (e.g., $^{137}Cs$).

When the downhole tool 12 includes the X-ray generator 18, the X-ray generator 18 may be any suitable X-ray generator capable of emitting X-rays through Bremsstrahlung radiation. For example, the X-ray generator 18 may be a high voltage X-ray generator such as that disclosed in U.S. Pat. No. 7,564,948, "HIGH VOLTAGE X-RAY GENERATOR AND RELATED OIL WELL FORMATION ANALYSIS APPARATUS AND METHOD," which is assigned to Schlumberger Technology Corporation. The X-ray generator 18 may accelerate electrons toward the target 20, which may be gold (Au) in certain embodiments, to produce X-rays through Bremsstrahlung radiation. Bremsstrahlung radiation occurs when an electron decelerates in a strong electric field, and when an energetic electron accelerated by the X-ray generator 18 enters the target 20, this electron may encounter strong electric fields due to the other electrons present in the target 20. The energetic electron then may decelerate until it has lost all of its kinetic energy, causing the emission of an X-ray. A continuous X-ray energy spectrum may be produced when summed over many decelerated electrons. The maximum X-ray energy will be equal to the total kinetic energy of the energetic electron, and the minimum X-ray energy in the observed Bremsstrahlung spectrum will be that of X-rays just able to exit the target 20 of the X-ray generator. In some embodiments, the X-ray target 20 may emit an X-ray spectrum that peaks at approximately 75% of the maximum beam energy (e.g., approximately 300 keV when the maximum beam energy is 400 keV or approximately 225 keV when the maximum beam energy is 300 keV). In some embodiments, the X-ray generator 18 may be operated with a switching filter to alternatively give off low and high energy X-ray spectra and/or broad or narrow spectra.

As will be discussed below, the X-rays emitted from the X-ray target 20 may exit the downhole tool 12 and pass into the materials surrounding the downhole tool 12. These X-rays may interact with the surrounding materials through, for example, Compton or Rayleigh scattering or via the photoelectric effect. Since these interactions produce measurable effects on the emitted X-rays, when the X-rays that return to the downhole tool are detected by a segmented X-ray detector 22, the amount and spectrum of this detected radiation may be used to determine a property of these materials.

The X-rays may exit the downhole tool 12 before being detected by the segmented X-ray detector 22 because the X-ray shielding 24 generally may not allow the X-rays to pass directly to the segmented X-ray detector 22. This X-ray shielding 24 may include, for example, tungsten (W) or lead (Pb). Since the X-rays generally cannot pass internally through the downhole tool 12, the X-rays instead may exit the housing 16. In some embodiments, such as the embodiment illustrated in FIG. 1, the shielding 24 may allow the X-ray generator 18 to emit X-rays in all directions other than directly through the downhole tool 12, in a manner similar to the way a light bulb emits light. In other embodiments, the shielding 24 may extend to surround the X-ray target 20 of the X-ray generator 18, except for certain channels through the X-ray shielding 24 that may collimate the emitted X-rays at specific angles. Such X-ray collimation may be used to limit the locations in the downhole tool 12 through which the X-rays enter the surrounding materials and/or to enable a specific depth of investigation (DOI), which may vary depending upon the axial angle at which the channels through the X-ray shielding 24 may collimate the emitted X-rays.

As will be discussed below, the segmented X-ray detectors 22 may include not only outward-facing segments that respectively detect X-rays from different azimuthal angles around the downhole tool 12, but also may include a reference segment that does not face an azimuthal angle of the downhole tool 12. As such, the reference segment generally may not detect any X-rays that return to the downhole tool 12 after interacting with the materials surrounding the downhole tool 12, since these X-rays typically may be detected by the outward-facing segments. Rather, the reference segment generally may only detect X-rays directly from the X-ray generator 18. These X-rays from the X-ray generator 18 that are detected by the reference segment may be used to calibrate the X-ray generator 18 and/or gain stabilize the segmented X-ray detector 22. In some embodiments, the shielding 24 may include a channel directly between the X-ray generator 18 and the segmented X-ray detector 22. Such a channel through the shielding 24 may allow some X-rays from the X-ray generator 18 to pass internally through the downhole tool 12 to the reference segment of the segmented X-ray detector 22.

The spectra of X-rays detected by the various segments of the segmented X-ray detectors 22 may be received by the data processing circuitry 14 as data 26. The data processing circuitry 14 may receive the data 26 and perform certain processing to determine one or more property of the materials surrounding the downhole tool 12. The data processing circuitry 14 may include a processor 28, memory 30, and/or storage 32. The processor 28 may be operably coupled to the memory 30 and/or the storage 32 to carry out the presently disclosed techniques. These techniques may be carried out by the processor 28 and/or other data processing circuitry based on certain instructions executable by the processor 28. Such instructions may be stored using any suitable article of manufacture, which may include one or more tangible, computer-readable media to at least collectively store these instructions. The article of manufacture may include, for example, the memory 30 and/or the nonvolatile storage 32. The memory 30 and the nonvolatile storage 32 may include any suitable articles of manufacture for storing data and executable instructions, such as random-access memory, read-only memory, rewriteable flash memory, hard drives, and optical disks.

The downhole tool 12 may transmit the data 26 to the data processing circuitry 14 via, for example, internal connections within the tool, a telemetry system communication downlink, and/or a communication cable. After receiving the data 26, the data processing circuitry 14 may stabilize the output of the X-ray generator 18 according to any suitable technique, including those discussed in U.S. Pat. No. 7,564, 948, which is mentioned above. In addition, the data processing circuitry 14 may stabilize the gain of the segmented X-ray detectors 22 and/or determine one or properties of the materials that surround the downhole tool 12. By way of example, such a property may include a likely composition and/or flow rate of the borehole fluid, a photoelectric effect relating to a lithology of the formation, a bulk density of the formation, and/or the azimuthal distribution of such properties around the downhole tool 12 depending on variations in the amount of radiation received from the various azimuthal angles detectable by a segmented X-ray detector 22. Thereafter, the data processing circuitry 14 may output a report 34 indicating the one or more ascertained properties of the formation. The report 34 may be stored in memory or may be provided to an operator via one or more output devices, such as an electronic display.

Figure 2:
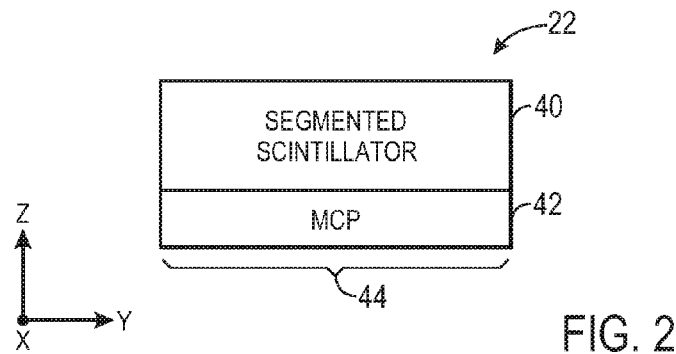
FIG. 2 is a block diagram of a segmented radiation detector, in accordance with an embodiment.

As noted above, the one or more segmented X-ray detectors 22 may be capable of detecting radiation from one or more azimuthal angle in the downhole tool 12. In one embodiment, shown in FIG. 2, a segmented radiation detector 22 may include a segmented scintillator 40 coupled to a microchannel plate (MCP) 42. The segmented scintillator 40 may convert X-rays into light. The light from the segmented scintillator 40 may be converted to an electrical signal by the MCP 42. The MCP 42 may differentiate which segment of the segmented scintillator 40 produces light, thereby differentiating which segment of the segmented scintillator 40 detected X-rays. The MCP 42 may include anodes 44 to read out electrically from which segment of the segmented scintillator 40 X-rays are detected. In other embodiments, the segmented X-ray detector 22 may include a number of photomultiplier tubes (PMTs). Each of the PMTs may be placed adjacent to the segmented scintillator 40 so as to detect light from a specific segment of the segmented scintillator 40.

Figure 3:
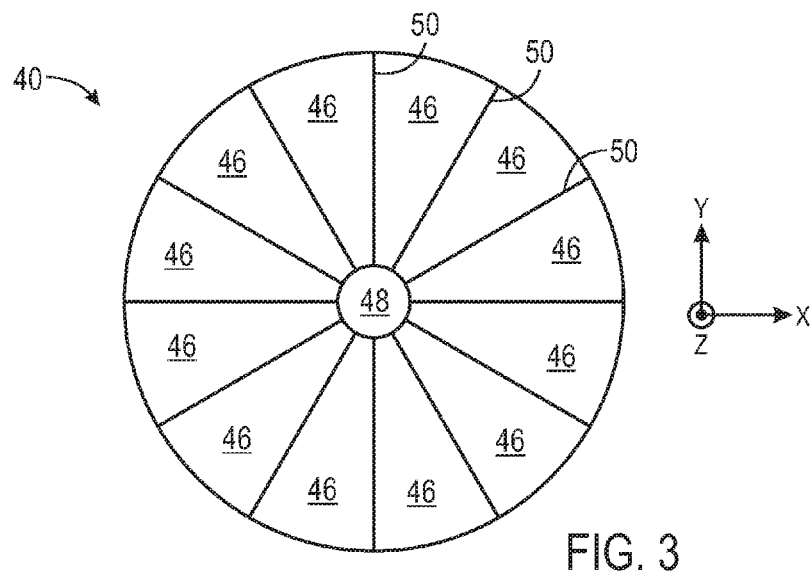
FIGS. 3-6 are schematic diagrams of segmented scintillators for use in the segmented radiation detector of FIG. 2, in accordance with an embodiment.

As shown in FIG. 3, the segmented scintillator 40 may include a variety of azimuthal segments 46 disposed around a central axis, each of the azimuthal segments 46 detecting X-rays from a specific azimuthal angle. Additionally, in some embodiments, the segmented scintillator 40 may include a reference segment 48, which generally does not detect X-rays arriving from any azimuthal angle. Other embodiments may not employ the reference segment 48. Each of the segments 46 and 48 of the segmented scintillator 40 may be separated by a reflective material 50, which may or may not also include a form of radiation shielding, such as tungsten (W) or lead (Pb).

While the azimuthal segments 46 of the segmented scintillator 40 may detect X-rays that return to the downhole tool 12 after interacting with the materials that surround the downhole tool 12, the reference segment 48 may detect substantially only those X-rays that pass internally through the downhole tool 12 from the X-ray generator 18. Since the X-rays detected by the reference segment 48 reflect only the output of the X-ray generator 18, these X-rays may serve as a reference for comparison to the X-rays detected by the other, azimuthal segments 46. That is, the X-rays from the X-ray generator 18 that are detected by the reference segment 48 may be used to calibrate the X-ray generator 18 and/or gain stabilize the segmented X-ray detector 22.

Figure 4:
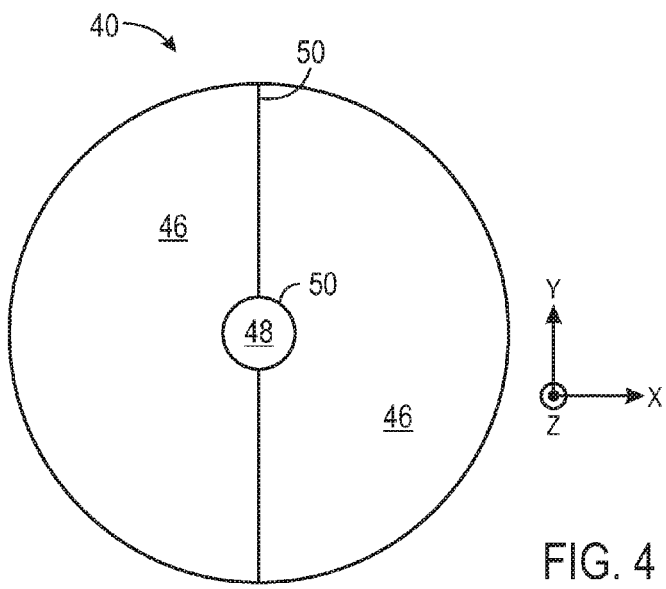
Figure 5:
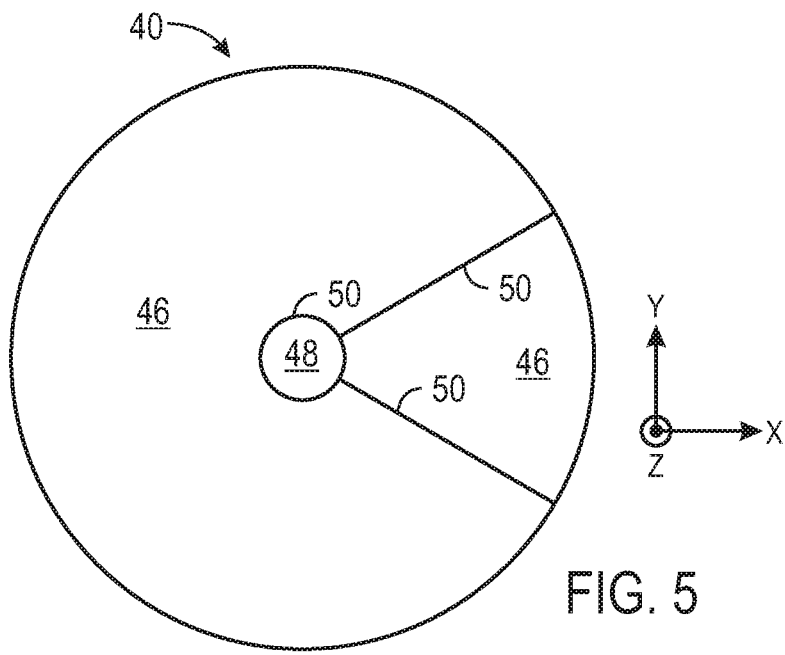
Figure 6:
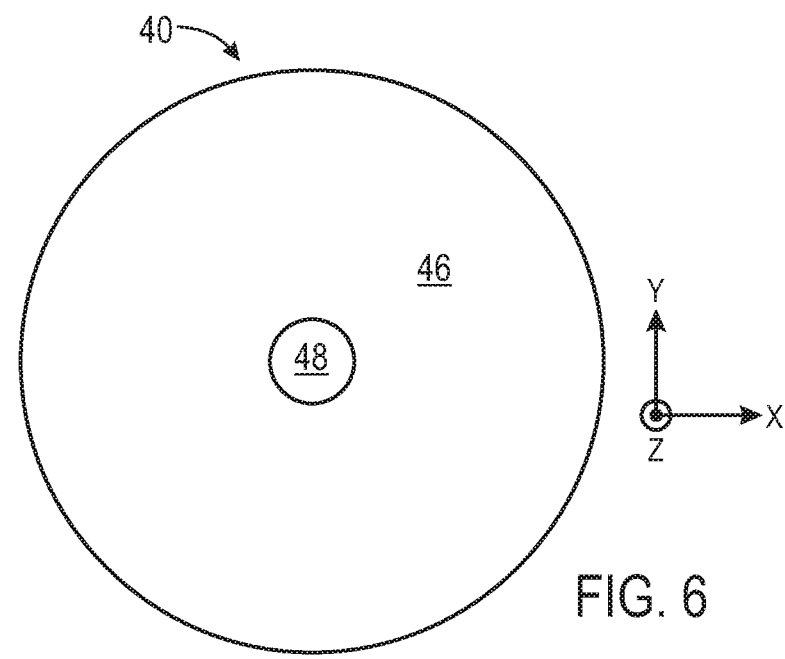

The segmented scintillator 40 may include any suitable number of segments 46. In the example of FIG. 3, the segmented scintillator 40 includes 12 equally distributed azimuthal segments 46, each of which may cover an azimuthal angle of approximately 30°. In other embodiments, the segmented scintillator 40 may more than 12 azimuthal segments 46, and at least one embodiment includes 36 azimuthal segments 46, each of which may cover an azimuthal angle of 10°. Some embodiments may include two or more azimuthal segments 46, as shown in FIGS. 4 and 5, and some embodiments may include only a single azimuthal segment 46 and a reference segment 48, as shown in FIG. 6. It should be appreciated that increasingly large numbers of azimuthal segments 46 (e.g., 12 or 36, and higher) may be made possible because the MCP 42 may be capable of distinguishing between scintillation signals from different azimuthal and reference segments 46 and 48 at a sufficiently fine resolution.

In the embodiments shown in FIGS. 4 and 5, the segmented scintillator 40 may include two azimuthal segments 46. The two azimuthal segments 46 may be divided evenly, such that half of the X-rays are detected from an azimuthal angle of 180°. The presence of two azimuthal segments 46 may allow the segmented scintillator 40 to differentiate between radiation arriving from a borehole-facing side of the downhole tool 12 and a formation-facing side of the downhole tool 12. Likewise, as shown in FIG. 5, certain embodiments of the segmented scintillator 40 may include two asymmetrical scintillator segments 46. That is, one scintillator segment may be configured primarily to detect radiation passing through borehole fluid, while the other may be configured to primarily detect radiation from the formation surrounding the downhole tool 12.

As mentioned above, in certain embodiments of the segmented scintillator 40, only one azimuthal segment 46 may be present alongside the reference segment 48 in the segmented scintillator 40. In some of these embodiments, such as that shown in FIG. 6, the azimuthal segment 46 of the segmented scintillator 40 may fully surround the reference segment 48 of the segmented scintillator 40. Although the segmented scintillator 40 of FIG. 6 may not differentiate between radiation arriving from various azimuthal angles, the reference segment 48 still may detect radiation from the X-ray generator 18 or a reference radioisotope source substantially exclusively, which therefore may be used for gain stabilization of the response of the azimuthal segment 46 and/or calibration of the X-ray generator 18.

Figure 7:
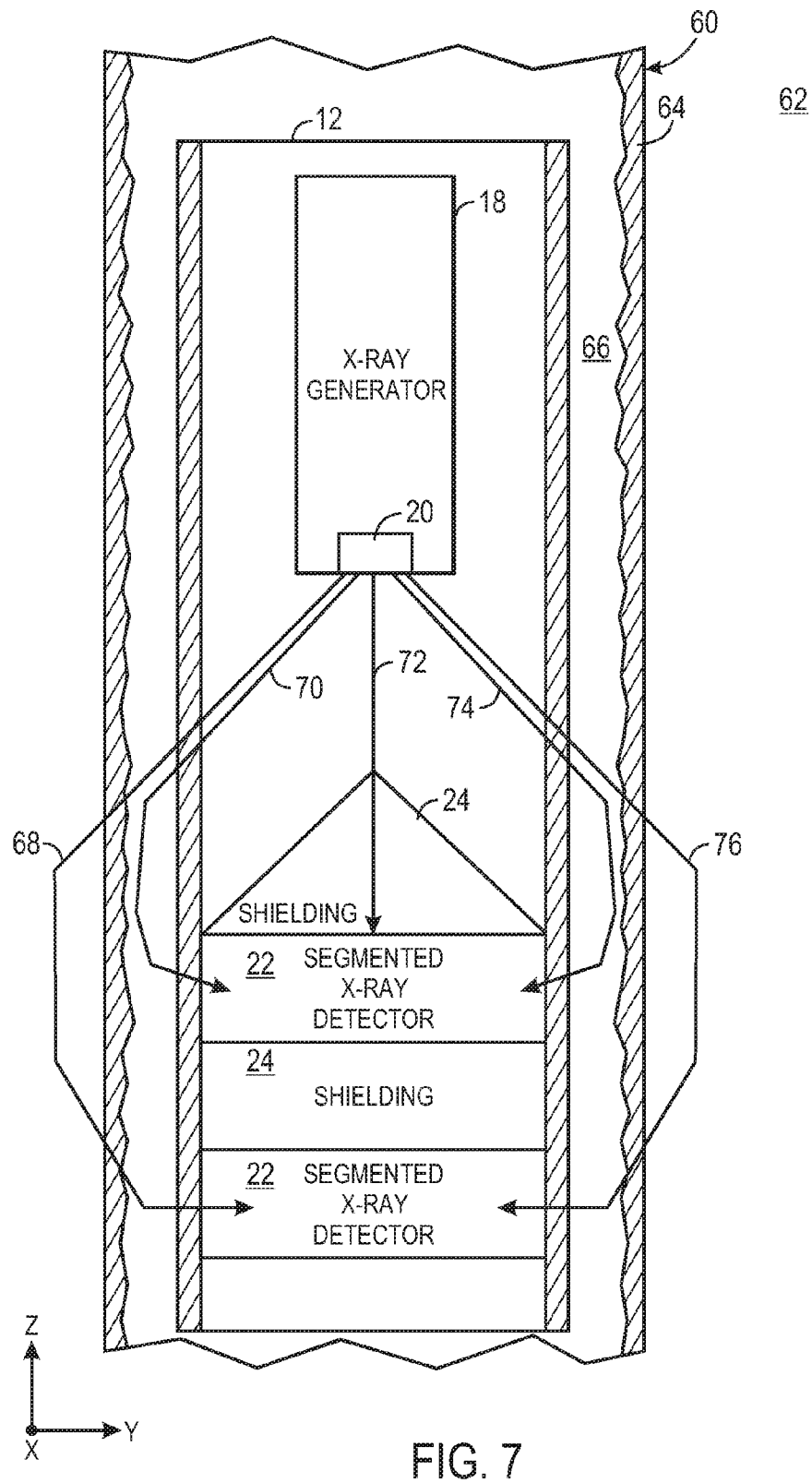
FIG. 7 is a schematic diagram of a well-logging operation using the downhole tool of FIG. 1, in accordance with an embodiment.

In practice, as shown in FIG. 7, the downhole tool 12 may be lowered into a borehole 60 through a subterranean formation 62 by any suitable means of conveyance, such as wireline, logging while drilling (LWD), and/or coiled tubing. The borehole 60 may or may not include casing 64. Borehole fluid 66 may fill the borehole 60. When the borehole 60 is producing oil and/or gas, the borehole fluid 66 may represent a variety of fluids, such as oil, water, and gas that may be flowing up toward the surface.

The downhole tool 12 may determine a property of the borehole fluid 66 and/or the formation 62 by emitting X-rays into the surrounding materials and detecting those X-rays that return. The X-ray generator 18 of the downhole tool 12 may emit X-rays, which may follow a variety of X-ray paths both out of and internally through the downhole tool 12. Some of these X-rays paths are illustrated, by way of example only, at numerals 68, 70, 72, 74, and 76. X-rays that generally follow the X-ray paths 68, 70, 72, 74, and 76 and other similar X-rays paths may be detected by the segmented X-ray detectors 22. It should be understood that, depending on the extent and shape of the shielding 24, the X-rays emitted by the target 20 of the X-ray generator 18 may spray out in all azimuthal directions and a variety of angles, as illustrated in FIG. 7, or the X-rays may be collimated by the shielding 24 at certain angles and locations around the downhole tool 12 in other embodiments.

X-ray paths such as those shown at numerals 68, 70, 74, and 76 may exit the downhole tool 12 and may interact with the materials surrounding the downhole tool 12 through, for example, Compton and/or Rayleigh scattering. Indeed, because the materials surrounding the downhole tool 12 at various azimuthal angles around the downhole tool 12 may vary, the degree to which the X-rays along the paths 68, 70, 74, and 76 may Compton or Rayleigh scatter may vary, and the spectra of X-rays that are detected by various azimuthal segments 46 of the segmented X-ray detectors 22 may vary. Based on such spectra, the data processing system 14 may determine a property of the various materials that may surround the downhole tool 12. Depending on the number and location of azimuthal segments 46 found in the segmented X-ray detector 22, the data processing system 14 may determine properties unique to materials found at certain azimuthal angles around the downhole tool 12.

Some X-rays may follow X-ray paths such as the X-ray path 72, which does not exit the downhole tool 12, but rather passes internally through the downhole tool 12 to a reference segment 48 of the segmented X-ray detector 22. As noted above, in some embodiments, the shielding 24 may include a channel by which such an X-ray path 72 may reach the reference segment 48. In some embodiments, some of the X-rays traveling along the X-ray path 72 may be detected by a reference segment 48 of a first segmented X-ray detector 22, while other X-rays traveling along the X-ray path 72 may continue through the downhole tool 12 to another reference segment 48 of a second segmented X-ray detector 22. The X-rays that follow an X-ray path such as the X-ray path 72 may be detected by the reference segments 48 of the segmented X-ray detectors 22, and may serve as a reference for calibration of the downhole tool 12 (e.g., gain stabilization of the segmented X-ray detectors 22 and/or output control of the X-ray generator 18).

Figure 8:
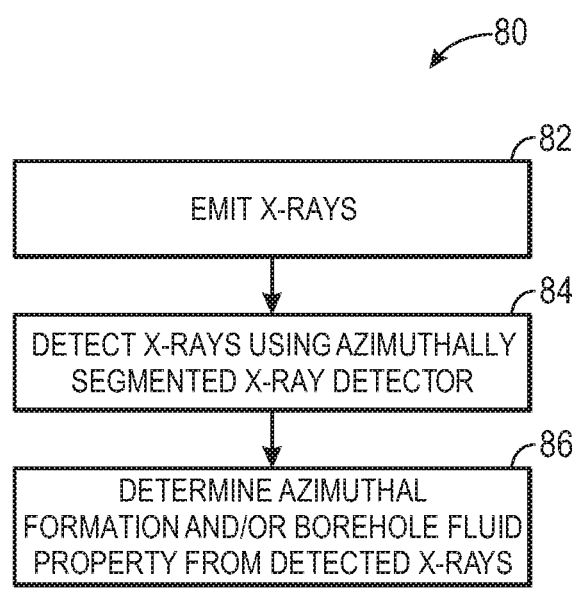
FIG. 8 is a flowchart describing an embodiment of a method for performing the well logging operation of FIG. 7.

As shown by flowchart 80 of FIG. 8, the downhole tool 12 first may emit X-rays from the X-ray generator 18 (block 82). In some embodiments, the X-ray generator 18 may be operated with a switching filter to cause the X-ray generator 18 to alternately give off low and high energy spectra. A segmented X-ray detector 22 of the downhole tool 12 may detect the X-rays that return after interacting with the materials surrounding the downhole tool 12 via, for example, Rayleigh or Compton scattering (block 84). In some instances, the segmented X-ray detectors 22 may detect a difference between the scattering rate of low and high energy X-ray spectra, which may enable the identification of the borehole fluid 66 according to any suitable technique. From the counts and/or spectra of the X-ray radiation detected by the segmented X-ray detector(s) 22, the data processing system 14 may determine properties of the materials surrounding the downhole tool 12 at various azimuthal angles using any suitable techniques (block 86). For example, the data processing system 14 may identify a composition of the borehole fluid 66 (e.g., water, oil, gas, combinations thereof, and so forth) or a density or lithology of the subterranean formation 62 at various azimuthal angles around the downhole tool 12. As noted above, the data processing system 14 may employ any suitable technique to determine such properties.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole tool comprising:
   a radiation source to emit collimated radiation beams out of the downhole tool at various angles;
   a segmented radiation detector comprising a plurality of segments capable of detecting radiation that returns to the downhole tool after interacting with material surrounding the downhole tool, wherein the segmented radiation detector is capable of distinguishing from which of a plurality of azimuthal angles around the downhole tool the radiation returns, and wherein the segmented radiation detector comprises a reference segment azimuthally surrounded by other segments of the plurality of segments; and radiation shielding configured to allow radiation directly from the radiation source to pass internally through the downhole tool to the reference segment;

wherein the radiation is neutrons, X-rays, and/or gamma-rays.

2. The downhole tool of claim 1, wherein the radiation source comprises an electronic radiation generator.

3. The downhole tool of claim 1, wherein the radiation source comprises an X-ray generator configured to emit X-rays azimuthally out of the downhole tool.

4. The downhole tool of claim 1, wherein the segmented radiation detector comprises a segmented scintillator having a plurality of azimuthal segments respectively capable of detecting radiation from the plurality of azimuthal angles around the downhole tool.

5. The downhole tool of claim 1, wherein the segmented radiation detector comprises a segmented scintillator having at least one axial reference segment capable of detecting substantially only radiation received directly from the radiation source.

6. The downhole tool of claim 1, comprising radiation shielding configured to shield a plurality of azimuthal segments of a segmented scintillator of the segmented radiation detector from radiation directly from the radiation source.

7. The downhole tool of claim 1, comprising radiation shielding configured to allow radiation from the radiation source to be emitted out of the downhole tool only at one or more certain angles around the downhole tool.

8. A method comprising:
lowering a downhole tool into a borehole surrounded by a subterranean formation;
emitting and collimating X-rays into the borehole at various angles using a X-ray generator of the downhole tool and emitting X-rays internally through the downhole tool toward a reference segment of an azimuthally segmented radiation detector, wherein the reference segment is azimuthally surrounded by other segments of the segmented radiation detector;
detecting a first plurality of X-rays that return to the downhole tool after interacting with materials surrounding the downhole tool using a first azimuthal segment of the azimuthally segmented radiation detector;
detecting a second plurality of X-rays that return to the downhole tool after interacting with materials surrounding the downhole tool using a second azimuthal segment of the azimuthally segmented radiation detector;
detecting X-rays that pass internally from the X-ray generator to the reference segment of the azimuthally segmented radiation detector; and
determining a property of the materials surrounding the downhole tool based at least in part on the first plurality of X-rays and the second plurality of X-rays using data processing circuitry associated with the downhole tool, wherein the property of the materials surrounding the downhole tool is determined based at least in part on the first plurality of X-rays and the second plurality of X-rays relative to the X-rays detected by the reference segment.

9. The method of claim 8, wherein the property comprises a composition of a borehole fluid of the borehole, a flow rate of the borehole fluid of the borehole, a lithology of the subterranean formation, or a bulk density of the subterranean formation, or a combination thereof.

10. The method of claim 8, wherein the property comprises an azimuthal distribution of a composition of a borehole fluid of the borehole, an azimuthal distribution of a flow rate of the borehole fluid of the borehole, an azimuthal distribution of a lithology of the subterranean formation, or an azimuthal distribution of a bulk density of the subterranean formation, or a combination thereof.

* * * * *